(12) United States Patent  
Brandes

(10) Patent No.: US 7,243,682 B2  
(45) Date of Patent: Jul. 17, 2007

(54) ANNULAR ONE-WAY VALVE

(76) Inventor: Raymond V. Brandes, 1844 Mt Cello Rd, Marianna, FL (US) 32448

( * ) Notice: Subject to any disclaimer, the term of this patent is extended or adjusted under 35 U.S.C. 154(b) by 258 days.

(21) Appl. No.: 10/677,580

(22) Filed: Oct. 2, 2003

(65) Prior Publication Data

US 2005/0072480 A1 Apr. 7, 2005

(51) Int. Cl.
*F16K 15/14* (2006.01)

(52) U.S. Cl. ............... 137/853; 137/515; 137/512.15; 222/212; 222/494

(58) Field of Classification Search ........... 137/512.15, 137/515, 515.5, 853; 222/206, 212, 213, 222/491, 494; 239/533.13, 533.2, 576
See application file for complete search history.

(56) References Cited

U.S. PATENT DOCUMENTS

| | | | |
|---|---|---|---|
| 384,306 A * | 6/1888 | Bourdil | 239/518 |
| 2,715,980 A | 8/1955 | Frick | |
| 3,601,151 A | 8/1971 | Winnard | |
| 3,739,952 A | 6/1973 | Chafitz et al. | |
| 4,250,844 A * | 2/1981 | Tews | 123/73 AV |
| 4,300,593 A * | 11/1981 | Ritter | 137/512.15 |
| 4,346,704 A | 8/1982 | Kulle | |
| 4,846,810 A | 7/1989 | Gerber | |
| 4,919,167 A | 4/1990 | Manska | |
| 5,092,855 A | 3/1992 | Pardes | |
| RE34,243 E | 5/1993 | Gerber | |
| 5,265,415 A * | 11/1993 | Cox, Jr. | 60/258 |
| 5,660,205 A | 8/1997 | Epstein | |
| 5,836,484 A | 11/1998 | Gerber | |
| 6,325,253 B1 | 12/2001 | Robinson | |
| 6,848,471 B2 * | 2/2005 | Floh et al. | 137/512.15 |

* cited by examiner

*Primary Examiner*—Ramesh Krishnamurthy  
(74) *Attorney, Agent, or Firm*—J. Wiley Horton

(57) ABSTRACT

A one-way valve with an annular nozzle. The valve body is a truncated cone with an interior fluid manifold. The truncated cone section includes a lower retaining groove and a fluid groove. A fluid conduit connects the interior fluid manifold to the fluid groove. An elastic cylinder having an internal diameter which is smaller than the truncated cone is slipped over the truncated cone. The lower portion of the elastic cylinder slips into the retaining groove. The upper portion rests over the fluid groove. When fluid pressure within the interior fluid manifold exceeds the pressure outside the valve, fluid flows through the conduit and into the fluid groove. This pressure urges the upper portion of the elastic cylinder away from the truncated cone Fluid then flows out through an annular nozzle formed between the upper portion of the elastic cylinder and the upper portion of the truncated cone. When pressure outside the valve exceeds the fluid pressure within the interior fluid manifold, the elastic cylinder is clamped tightly against the truncated cone, thereby preventing flow back through the valve.

11 Claims, 8 Drawing Sheets

ANNULAR ONE-WAY VALVE

BACKGROUND OF THE INVENTION

1. Field of the Invention

This invention relates to the field of fluid control. More specifically, the invention comprises a one-way valve with an annular nozzle.

2. Description of the Related Art

One-way or "check" valves have been in common use for many years. These valves permit fluid flow in one direction while preventing reverse flow. The most common type is a ball and spring valve, where fluid pressure in one direction urges a spring-loaded ball off its seat, thereby permitting flow, while fluid pressure in the opposite direction urges the spring-loaded ball against its seat, thereby preventing flow. Such valves are relatively complex. They require precisely formed seals between the ball and the valve seat. They also tend to trap a small amount of fluid in the valve body, which can lead to additional "dripping" flow after the shut off. The remaining fluid can also contaminate the valve, such as where an air-drying liquid is being fed through the valve.

Reed valves have also been used to create unidirectional flow. These don't tend to trap residual fluids within the valve body. However, they are subject to contamination by small particles, even one of which can cause the valve to remain open when it should be closed. Reed valves, as well as other prior art valve types, are also generally formed of several component parts which must be assembled via rivets, threads, and the like. A simpler valve is obviously desirable.

BRIEF SUMMARY OF THE INVENTION

The present invention comprises a one-way valve with an annular nozzle. The valve body is a truncated cone with an interior fluid manifold. The truncated cone section includes a lower retaining groove and a fluid groove. A fluid conduit connects the interior fluid manifold to the fluid groove. An elastic cylinder having an internal diameter which is smaller than the truncated cone is slipped over the truncated cone. The lower portion of the elastic cylinder slips into the retaining groove. The upper portion rests over the fluid groove. When fluid pressure within the interior fluid manifold exceeds the pressure outside the valve, fluid flows through the conduit and into the fluid groove. This pressure urges the upper portion of the elastic cylinder away from the truncated cone Fluid then flows out through an annular nozzle formed between the upper portion of the elastic cylinder and the upper portion of the truncated cone.

When pressure outside the valve exceeds the fluid pressure within the interior fluid manifold, the elastic cylinder is clamped tightly against the truncated cone, thereby preventing flow back through the valve. In this fashion, flow is only permitted in one direction. Because the valve includes no cavities downstream of the "check" feature, no unwanted fluid is retained within the valve.

Figure 1:
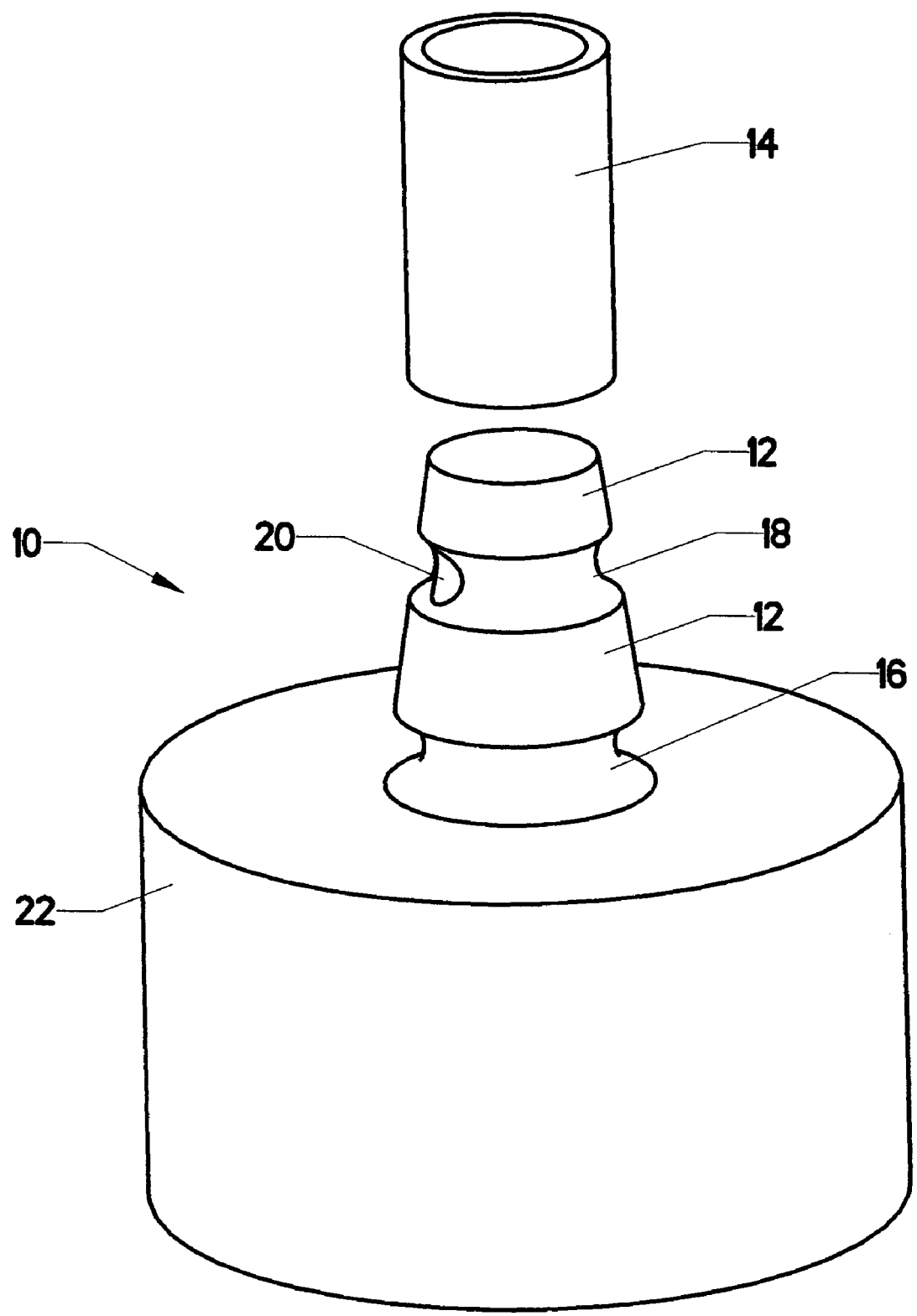
FIG. 1 is an exploded perspective view, showing the valve assembly.

| REFERENCE NUMERALS IN THE DRAWINGS | | | |
|---|---|---|---|
| 10 | valve assembly | 12 | truncated cone |
| 14 | elastic cylinder | 16 | retaining groove |
| 18 | fluid groove | 20 | conduit |
| 22 | connector | 24 | female thread |
| 26 | inlet cavity | 28 | fluid manifold |
| 30 | annular nozzle | 32 | in-line variant |
| 34 | outlet cavity | 36 | injector variant |

DETAILED DESCRIPTION OF THE INVENTION

FIG. 1 shows valve assembly 10 in a disassembled state. Truncated cone 12 has a lower end that is larger then its upper end (where "upper" and "lower" are understood in the context of the orientation shown in the view). Retaining groove 16 is cut into the lower end, while fluid groove 18 is cut into the truncated cone between retaining groove 16 and the upper end of the truncated cone. Connector 22 provides a connection point to a source of fluid which feeds into the valve. Elastic cylinder 14 is hollow. It is made of a pliable material, so that it can be slipped over truncated cone 12, as will be described subsequently.

Figure 2:
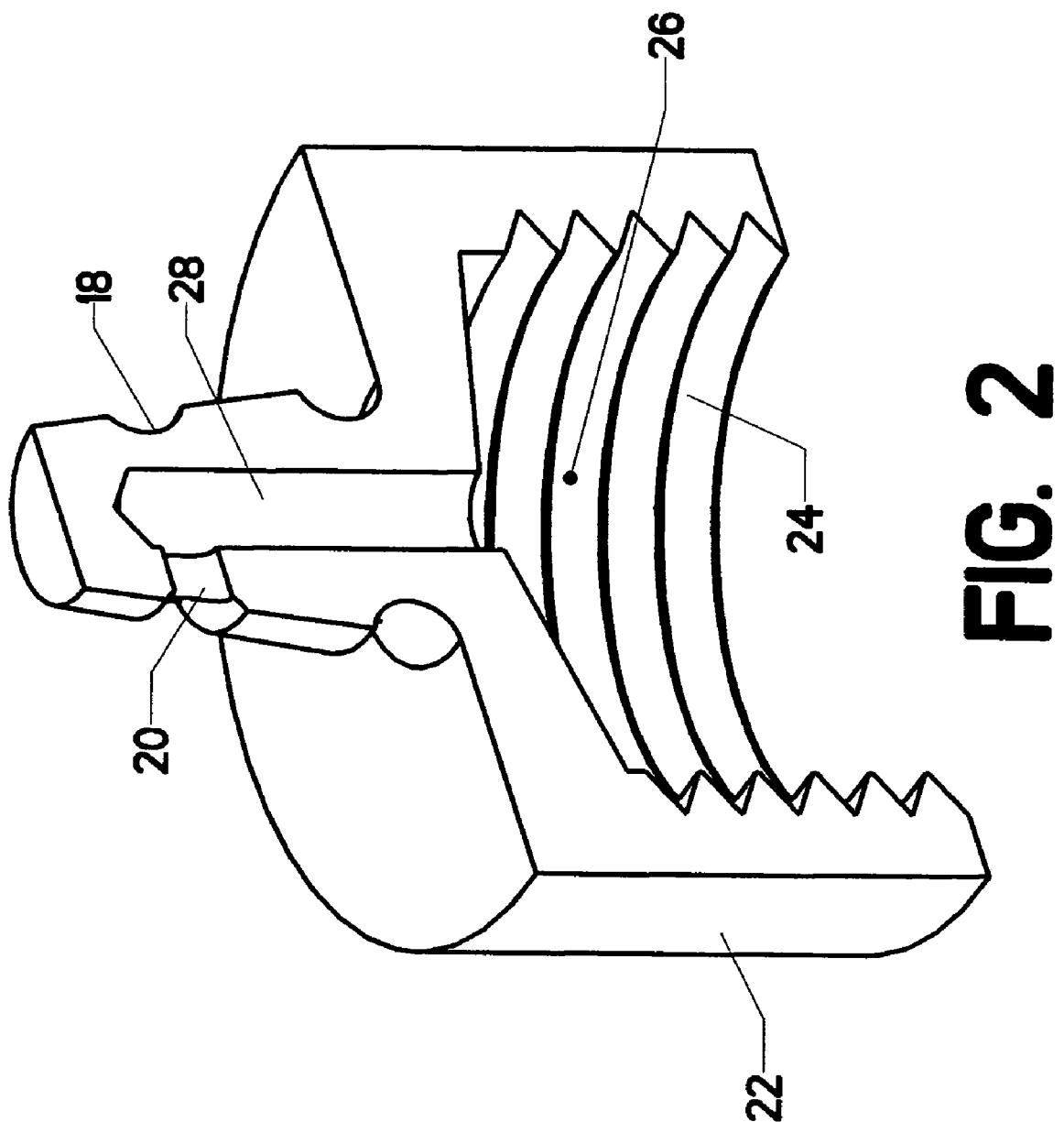
FIG. 2 is a sectional view, showing the internal details of the truncated cone.

FIG. 2 is a sectional view through the valve, with elastic cylinder 14 removed. Fluid flows from inside connector 22 through inlet cavity 26, fluid manifold 28, and conduit 20. Conduit 20 connects fluid manifold 28 to fluid groove 18.

Figure 3:
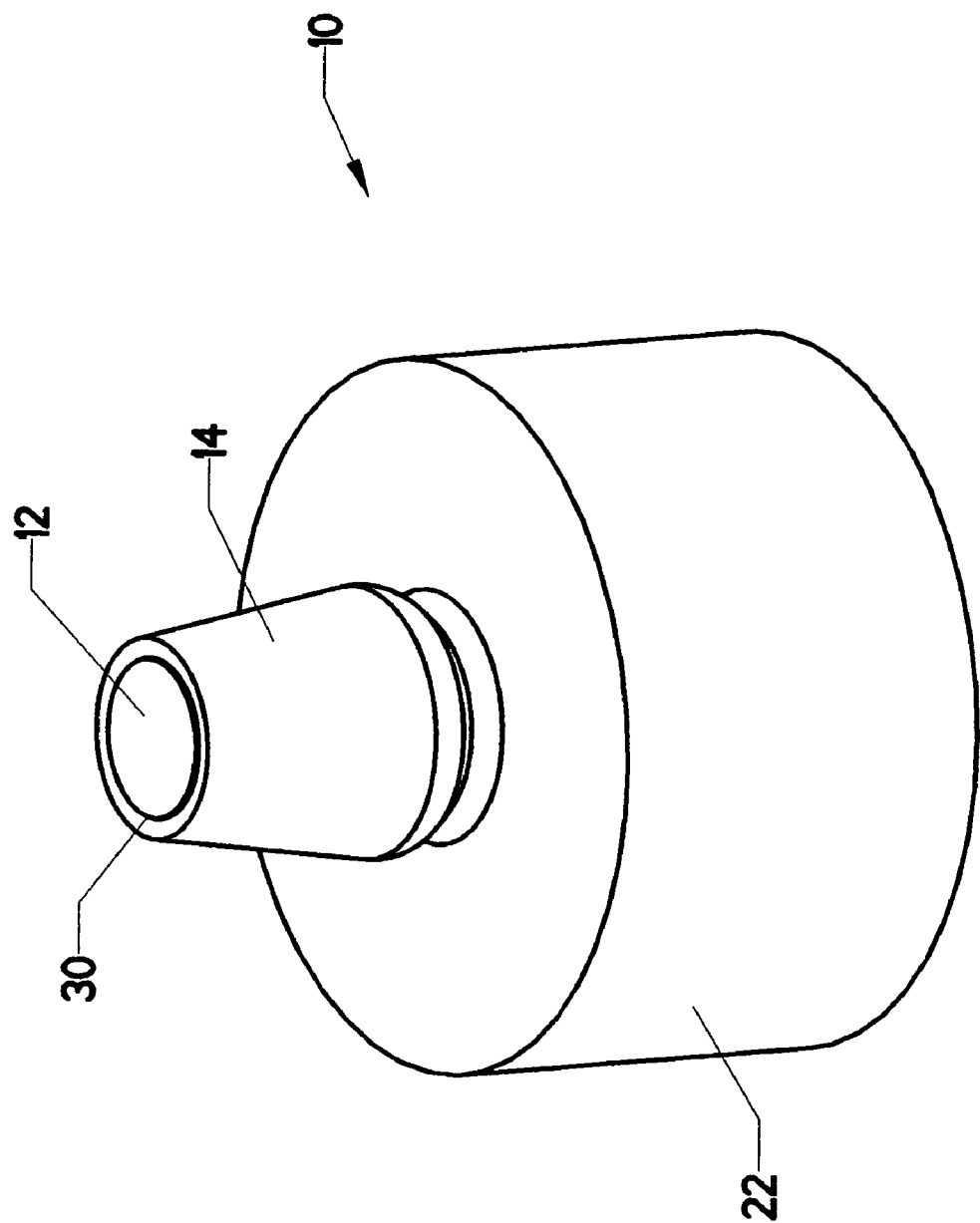
FIG. 3 is a perspective view, showing the valve in an assembled state.
Figure 4:
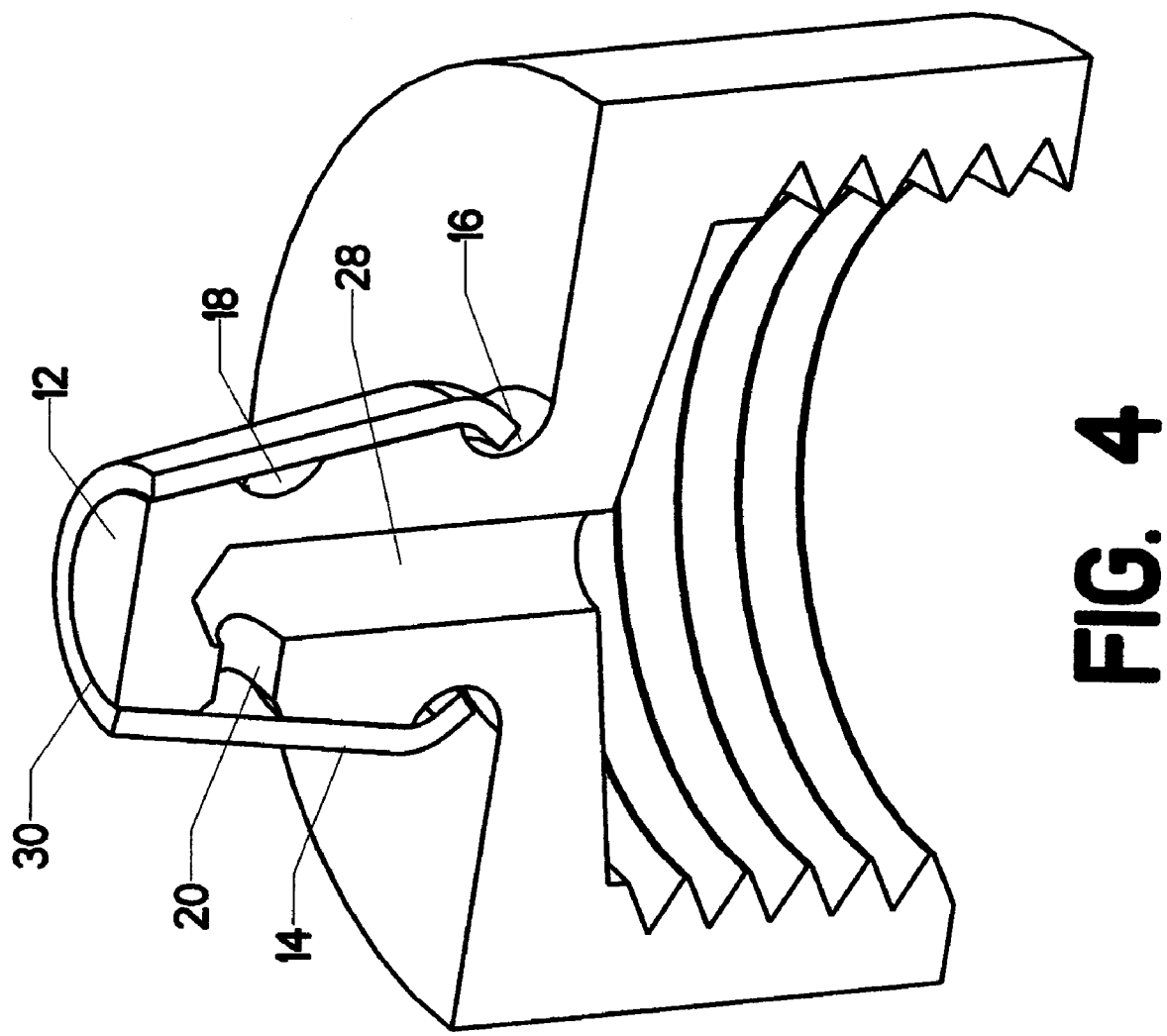
FIG. 4 is a sectional view, showing the internal details of the assembled valve.

FIG. 3 shows a view of valve assembly 10 in an assembled state. Elastic cylinder 14 has been placed over truncated cone 12. The inner diameter of elastic cylinder 14 is significantly smaller than the maximum diameter of truncated cone 12. Thus, elastic cylinder 14 must deform as shown. FIG. 4 is a sectional view through truncated cone 12 and elastic cylinder 14. The reader will observe that the lower portion of elastic cylinder 14 slips into retaining groove 16, while the middle portion lays over fluid groove 18. The upper portion of elastic cylinder 14 lies tightly against the upper portion of truncated cone 12. A potential gap exists between the upper portion of elastic cylinder 14 and the upper portion of truncated cone 12, which is ordinarily sealed. This potential gap is denoted as annular nozzle 30.

Figure 5:
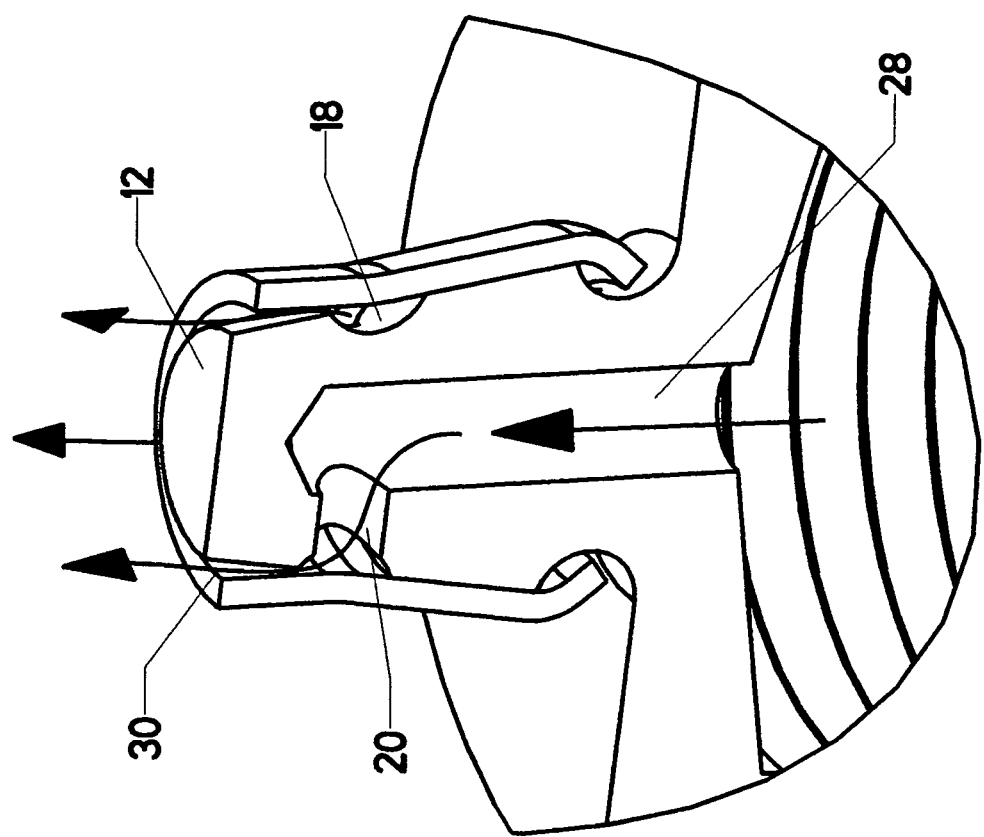
FIG. 5 is a sectional view, showing the operation of the valve.

FIG. 5—another sectional view—shows the operation of the valve. When fluid pressure within inlet cavity 26 exceeds the pressure downstream of the valve, the valve opens to admit flow. The pressure is transmitted through fluid manifold 28, conduit 20, and around fluid groove 18. The shape of the truncated cone dictates that the part of elastic cylinder 14 lying above fluid groove 18 ("above" in the view as shown) is less tightly stretched than the portion lying below fluid groove 18. Thus, the fluid travels upward, deflecting that portion of elastic cylinder 14 away from truncated cone 12.

Annular nozzle 30 opens and the fluid escapes in the direction indicated by the arrows. The reader should note that the deformation of elastic cylinder 14 is exaggerated in the view. The width across the annular nozzle will actually be quite small. In fact, the fluid may escape at two or three main points around the annular nozzle. Thus, the term "annular nozzle" is intended to describe the shape of the potential gap and not necessarily the shape of the actual fluid flow.

Figure 6:
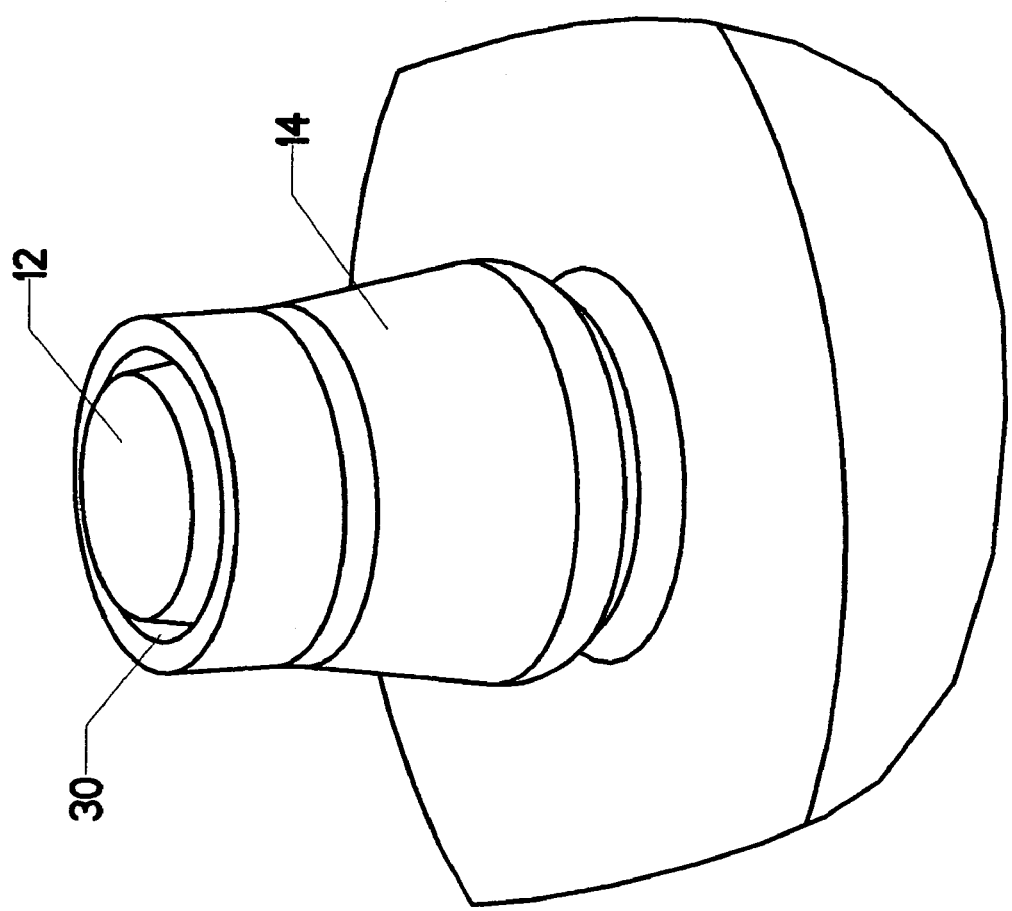
FIG. 6 is a perspective view, showing the operation of the valve.

FIG. 6 shows the same view without the section. Again, the width across annular nozzle 30 is exaggerated for purposes of visual clarity. Of course, when the pressure downstream of the valve (above and around the elastic cylinder in the view as shown) exceeds the pressure within inlet cavity 26, elastic cylinder 14 will be clamped tightly against truncated cone 12, thereby closing the valve against reverse flow. Those skilled in the art will therefore understand that the valve is a one-way "check" type of valve. In looking back at FIG. 4, those skilled in the art will also realize that no fluid is retained within the valve downstream of the "check" feature (the interface of fluid groove 18 with the interior of elastic cylinder 14). This feature allows the valve to be effectively used in many applications, including:

1. Medical valves, where back-flow can contaminate the fluid source with non-sterile agents;
2. Spraying operations, where exposure of the fluid to air can cause the fluid to solidify, thereby blocking the valve;
3. Fuel injection, where residual fuel within the valve tends to build carbon deposits; and
4. Fluid metering operations, where a specific amount of fluid must be added with no subsequent "drip" flow.

Figure 7:
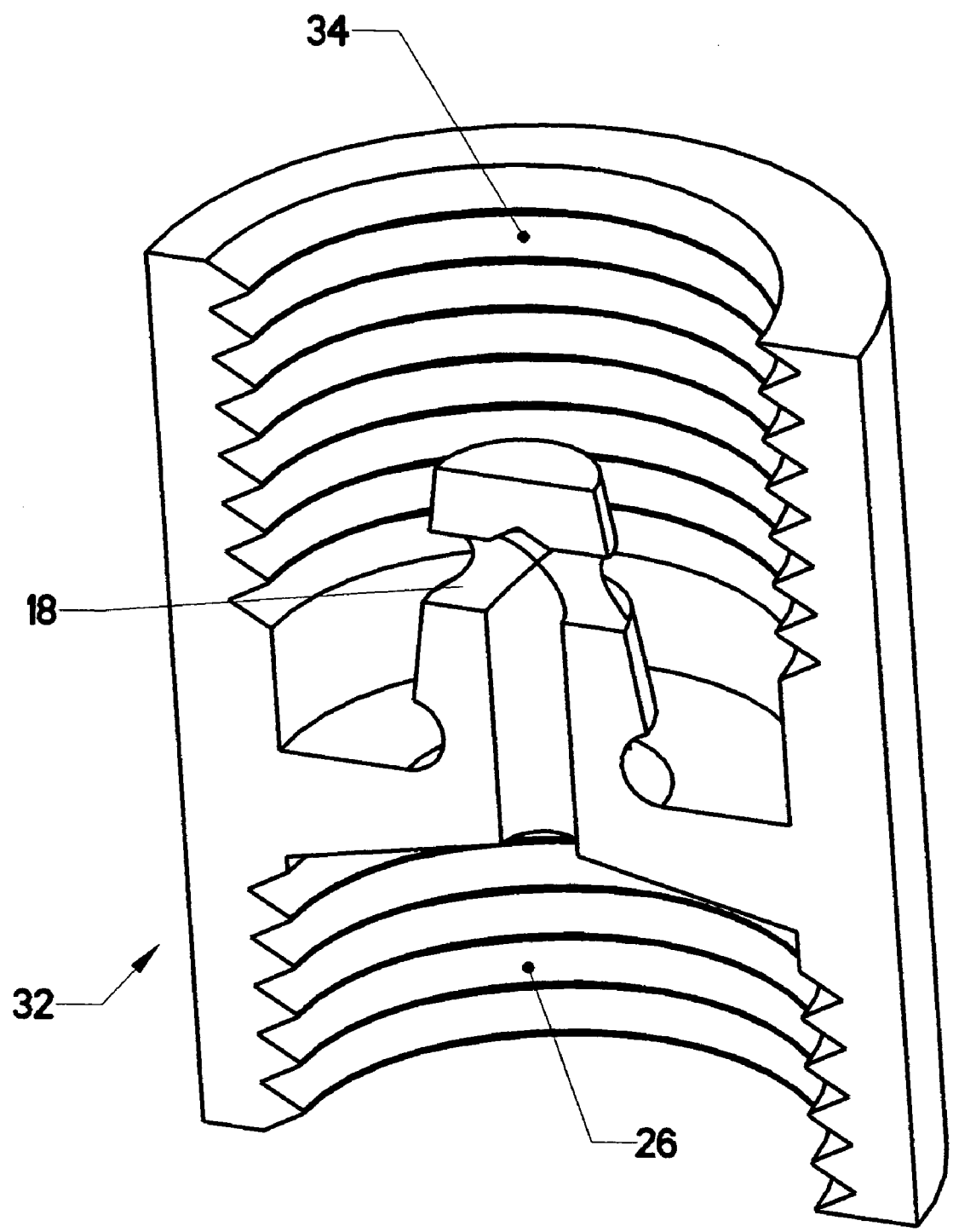
FIG. 7 is a sectional view, showing a version of the valve configured for installation in a fluid line.

The previous illustrations of the valve have not placed it in the context of a larger fluid circuit. Such a circuit is, of course, not particularly important to the invention. However, the reader may wish to know how the valve can be adapted for placement within a fluid circuit. FIG. 7 shows a version of the valve designated as in-line variant 32. It contains inlet cavity 26 on the "upstream" side and outlet cavity 34 on the "downstream" side. Both cavities have female threads, so that in-line variant 32 can be threaded into a pipeline (Those skilled in the art will know that it may be advisable to use right-hand threads on one end and left-hand threads on the other). For the particular version shown, conduit 20 goes completely through truncated cone 12 and is larger in size. This permits greater flow through the valve. One, two, three, or more holes can be used for conduit 20. Slots or other prior art features can also be substituted.

The body of the valve can be made from plastic, brass, iron, aluminum, or other known materials. The material used for the elastic cylinder depends on the pressure desired across the valve, as well as the fluid used and the expected range of temperatures. For water control using a moderate opening pressure, elastic cylinder 14 can be made of a short piece of vinyl tubing. Numerous other polymers will work. Higher temperature and pressure applications must obviously use different materials.

Figure 8:
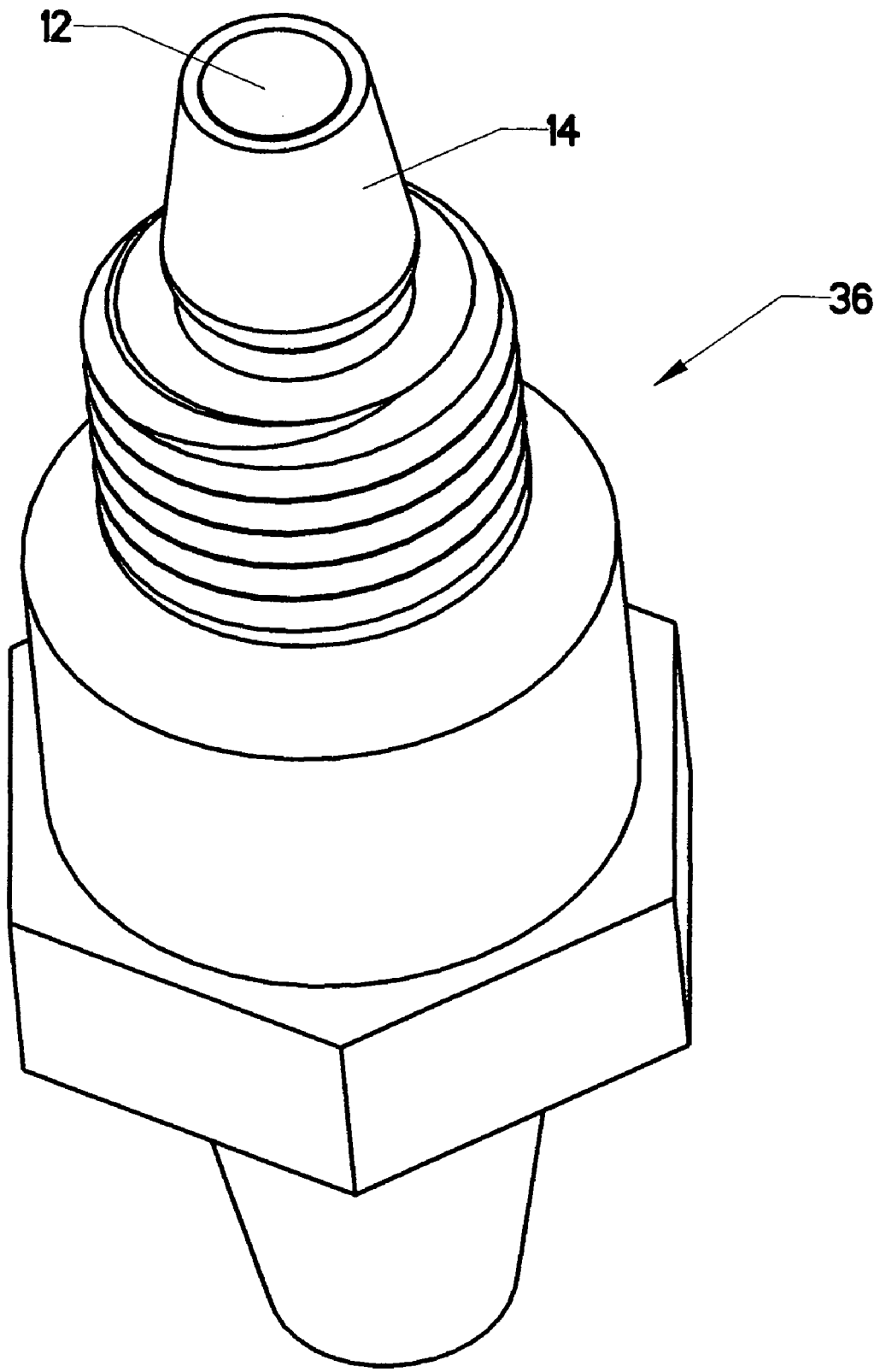
FIG. 8 is a perspective view, showing a version of the valve configured for use as a fuel injector.

FIG. 8 shows one such application. The valve assembly shown is used as a diesel fuel injector, designated as injector variant 36. Truncated cone 12, elastic cylinder 14, and the internal features are the same as described previously. However, different materials must be used. The valve body is typically steel. Elastic cylinder 14 must be metal in order to withstand the combustion temperatures. Spring steel is one possible choice for elastic cylinder 14. In this case, the taper of truncated cone 12 is significantly reduced, since the range of elastic deformation for spring steel is obviously less than for vinyl. It may also be desirable to swage the lower portion of the elastic cylinder into the retaining groove. The function of the valve is thereafter identical to the processes described for the plastic and vinyl versions. It opens when the diesel injector pump sends a high-pressure "burst" to the valve, and closes once the burst passes. When the fuel/air mixture ignites within the combustion chamber, the valve closes and prevents any back flow.

The preceding description contains significant detail regarding the novel aspects of the present invention. It is should not be construed, however, as limiting the scope of the invention but rather as providing illustrations of the preferred embodiments of the invention. Thus, the scope of the invention should be fixed by the following claims, rather than by the examples given.

Having described my invention, I claim:

1. A fluid control valve, comprising:
   a. a truncated cone, having a first end and a second end, wherein said first end is larger than said second end;
   b. a retaining groove, proximate said first end of said truncated cone;
   c. a fluid groove, between said retaining groove and said second end of said truncated cone; wherein the truncated cone continuously tapers from its second end to its first end, with the exception of the presence of the fluid groove,
   d. a fluid manifold inside said truncated cone;
   e. a conduit connecting said fluid manifold and said fluid groove; and
   f. a hollow elastic cylinder, having a first end and a second end, and being sized to fit tightly over said truncated cone, wherein said first end lies tightly within said retaining groove and wherein said second end lies tightly against said second end of said truncated cone, thereby forming an annular nozzle between said hollow elastic cylinder and said truncated cone.

2. A fluid control valve as recited in claim 1, further comprising a connector, proximate said first end of said truncated cone, for connecting said fluid control valve to a fluid source.

3. A fluid control valve as recited in claim 2, further comprising a second connector, proximate said second end of said truncated cone, for connecting said fluid control valve to a fluid circuit.

4. A fluid control valve as recited in claim 1, wherein said conduit is a hole between said fluid manifold and said fluid groove.

5. A fluid control valve as recited in claim 1, wherein said conduit is a plurality of holes between said fluid manifold and said fluid groove.

6. A fluid control valve as recited in claim 1, wherein said elastic cylinder is made from a material capable of withstanding high temperatures.

7. A fluid control valve as recited in claim 1, wherein said elastic cylinder made from a very elastic material so that it can be manually placed over said truncated cone.

8. A fluid control valve as recited in claim 2, wherein said connector includes a thread.

9. A fluid control valve as recited in claim 3, wherein said connector includes a thread and said second connector includes a thread.

10. A fluid control valve as recited in claim 6, wherein said elastic cylinder is made of spring steel.

11. A fluid control valve as recited in claim 7, wherein said elastic cylinder is made of vinyl.

* * * * *